United States Patent
Kim et al.

(10) Patent No.: US 8,037,335 B2
(45) Date of Patent: Oct. 11, 2011

(54) APPARATUS AND METHOD FOR SYNCHRONIZING A CHANNEL CARD IN A MOBILE COMMUNICATION SYSTEM

(75) Inventors: Keun-Bok Kim, Suwon-si (KR); Seock-Kyu Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 778 days.

(21) Appl. No.: 12/048,393

(22) Filed: Mar. 14, 2008

(65) Prior Publication Data

US 2008/0226005 A1 Sep. 18, 2008

(30) Foreign Application Priority Data

Mar. 15, 2007 (KR) .................. 10-2007-0025397

(51) Int. Cl.
*G06F 1/12* (2006.01)
*H04L 7/00* (2006.01)
*H03M 13/00* (2006.01)
(52) U.S. Cl. .................. 713/400; 713/401; 714/775
(58) Field of Classification Search ............ 713/400, 713/401
See application file for complete search history.

(56) References Cited

U.S. PATENT DOCUMENTS

| 5,327,436 | A  | * | 7/1994 | Miyazaki ................. 714/775 |
| 5,781,541 | A  | * | 7/1998 | Schneider ................ 370/335 |
| 5,875,402 | A  | * | 2/1999 | Yamawaki ............... 455/502 |
| 6,553,224 | B1 | * | 4/2003 | Kim ....................... 455/426.1 |
| 6,885,647 | B1 | * | 4/2005 | Chung et al. ............ 370/335 |
| 7,110,437 | B2 | * | 9/2006 | Oates et al. .............. 375/147 |

FOREIGN PATENT DOCUMENTS

| KR | 10-2001-0064257 A | 7/2001 |
| KR | 10-2004-0007159 A | 1/2004 |
| KR | 10-2004-0031117 A | 4/2004 |

* cited by examiner

*Primary Examiner* — Suresh Suryawanshi
(74) *Attorney, Agent, or Firm* — Jefferson IP Law, LLP (57) ABSTRACT

An apparatus and a method for synchronization in a channel card in a mobile communication system are provided. A channel card for synchronizing a Digital Signal Processing (DSP) modem and a system clock in a mobile communication system includes the DSP modem for sending a reference signal, informing of a start of a transmission, to a Field-Programmable Gate Array (FPGA) modem, and the FPGA modem for comparing a reception time of the reference signal with a Global Positioning System (GPS) timer, for recording a GPS timer value corresponding to a start point based on the comparison, and for sending to the DSP modem the recorded GPS timer value corresponding to the start point at a preset GPS timer reference time.

17 Claims, 9 Drawing Sheets

APPARATUS AND METHOD FOR SYNCHRONIZING A CHANNEL CARD IN A MOBILE COMMUNICATION SYSTEM

PRIORITY

This application claims the benefit under 35 U.S.C.§119(a) of a Korean patent application filed in the Korean Intellectual Property Office on Mar. 15, 2007 and assigned Serial No. 2007-25397, the entire disclosure of which is hereby incorporated by reference.

BACKGROUND OF THE INVENTION

1. Field of the Invention

The present invention relates generally to an apparatus and a method for synchronizing a channel card in a mobile communication system. More particularly, the present invention relates to an apparatus and a method for synchronizing a Digital Signal Processing (DSP) modem and a system clock in a channel card, and for synchronizing a plurality of channel cards.

2. Description of the Related Art

In conventional mobile communication systems, a base station uses a channel card to generate signals to be sent to a terminal or to recover signals received from the terminal. For instance, in an Orthogonal Frequency Division Multiplexing (OFDM) wireless communication system, the channel card generates or recovers OFDM signals. The channel card of a Code Division Multiple Access (CDMA) wireless communication system generates and recovers spread-spectrum signals.

Figure 1:
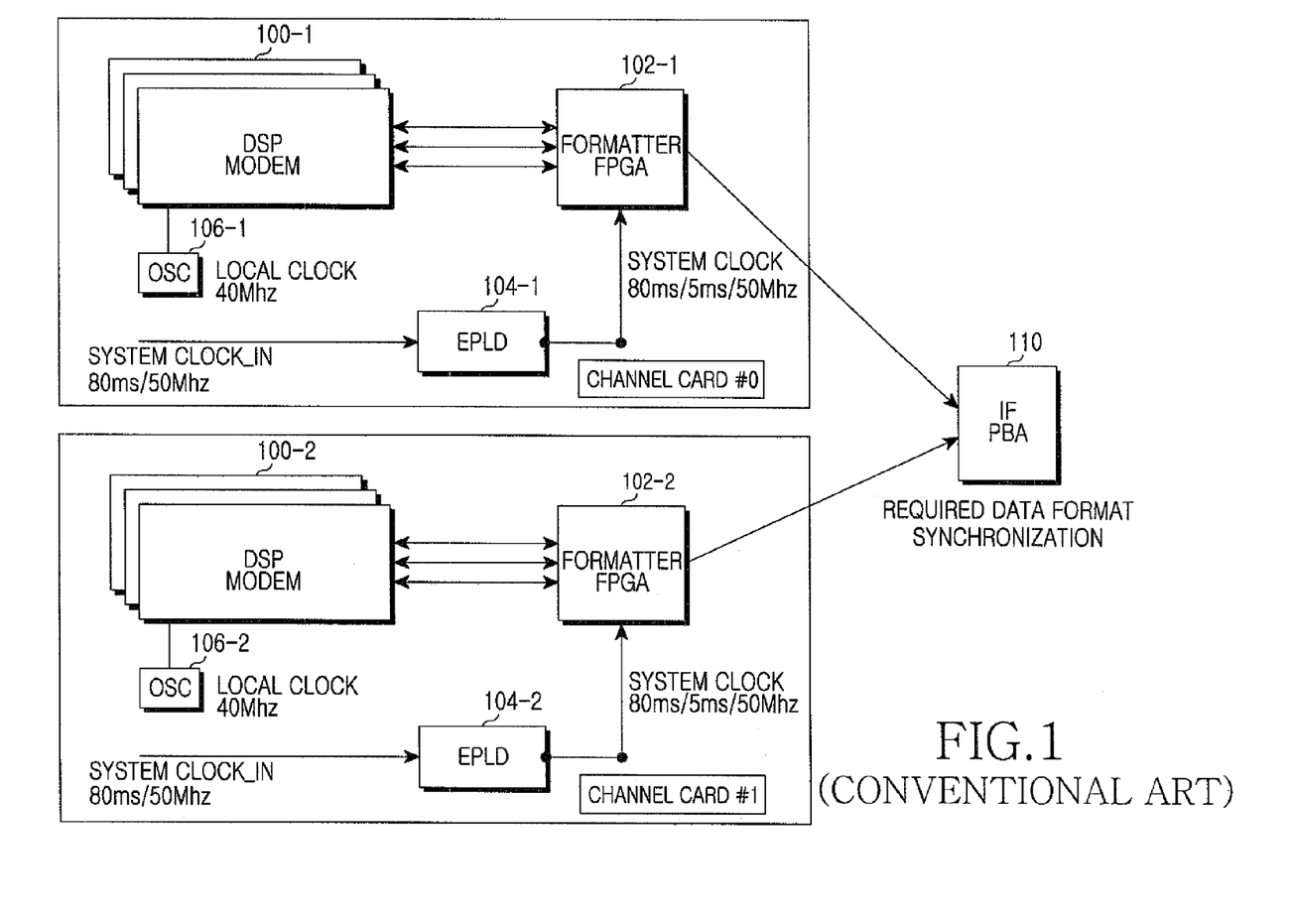
FIG. 1 is a block diagram illustrating two conventional channel cards of a first type.

FIG. 1 is a block diagram of a two conventional channel cards of a first type.

A first channel card #0 of FIG. 1 includes a Digital Signal Processing (DSP) modem 100-1, a Field-Programmable Gate Array (FPGA) formatter 102-1, an Electrically Programmable Logic Device (EPLD) 104-1 and an oscillator (OSC) 106-1. A second channel card #1 of FIG. 1 includes a Digital Signal Processing (DSP) modem 100-2, a Field-Programmable Gate Array (FPGA) formatter 102-2, an Electrically Programmable Logic Device (EPLD) 104-2 and an oscillator (OSC) 106-2.

Each of the DSP modems 100-1 and 100-2 processes (e.g., OFDM modulates/demodulates or CDMA modulates/demodulates) digital data, acquired from an Analog-to-Digital (A/D) converter (not shown), through an algebraic operation. The DSP modems 100-1 and 100-2 operate respectively by receiving a DSP processing clock signal from oscillators (OSCs) 106-1 and 106-2, which may be 40 Mhz oscillators. The EPLDs 104-1 and 104-2 respectively issue a signal for controlling the FPGA formatters 102-1 and 102-2 and provide system clock signals, such as 80 ms/5 ms/50 Mhz clock signals, required for the operation of the FPGA formatters 102-1 and 102-2. The FPGA formatters 102-1 and 102-2 respectively match the signals of the DSP modems 100-1 and 100-2 and each send the matched signals to an InterFace (IF) board 110.

However, when the DSP modems 100-1 and 100-2 include only Digital Signal Processors (DSPs), as illustrated in FIG. 1, there is no interface to receive an interrupt for system clock (e.g., 80 ms and 5 ms) synchronization. Therefore, a specific protocol for the system synchronization is required.

Figure 2:
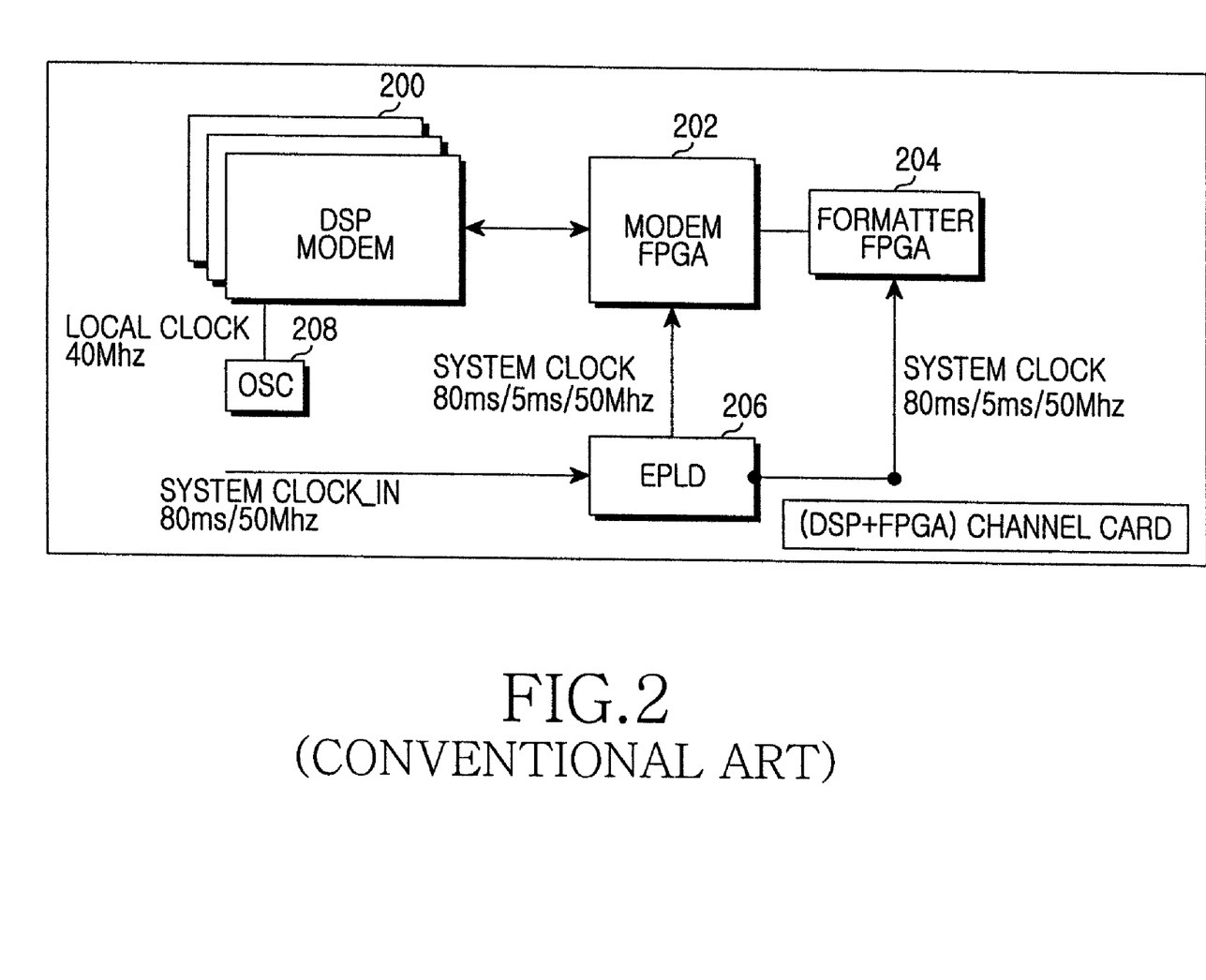
FIG. 2 is a block diagram illustrating a conventional channel card of a second type.

FIG. 2 is a block diagram of a conventional channel card of a second type.

In the channel card of FIG. 2, a DSP modem 200 and an FPGA modem 202 process and generate data within the FPGA section. Thus, a protocol for a separate synchronization is unnecessary.

However, since the DSP modem 200 of the channel card of FIG. 2 operates by receiving a clock signal from the local oscillator 208, such as a 40 MHz oscillator, the data output timing may change with respect to the data synchronized to the 80 ms/5 ms/50 Mhz clock signals from the EPLD 206 every time the channel card is powered on/off. As a result, a problem may arise when the IF board combines the data output from different channel cards. In other words, when the FPGA formatter 204 receives the data from the DSP modem 200 as in the conventional channel card, the synchronization in the channel card or between the channel cards may differ because of the respective timing of DSP processing clock changing due to a power on/off. In addition, since the hardware of the conventional DSP modem cannot receive and process the system clock directly, synchronization with the system is infeasible.

Therefore, what is needed is an apparatus and a method for processing the synchronization of the DSP modem and the FPGA modem in the channel card, and the synchronization between the channel cards including the DSP modem and the FPGA modem.

SUMMARY OF THE INVENTION

An aspect of the present invention is to address at least the above mentioned problems and/or disadvantages and to provide at least the advantages described below. Accordingly, an aspect of the present invention is to provide an apparatus and a method for synchronizing a DSP modem and a system clock in a channel card.

Another aspect of the present invention is to provide an apparatus and a method for synchronizing data output from a DSP modem in a channel card.

Yet another aspect of the present invention is to provide an apparatus and a method for synchronizing a plurality of channel cards in a mobile communication system.

The above aspects are addressed by providing a channel card for synchronizing a DSP modem and a system clock in a mobile communication system. The channel card includes the DSP modem for sending a reference signal, informing of a start of a transmission, to a Field-Programmable Gate Array (FPGA) modem, and the FPGA modem for comparing a reception time of the reference signal with a Global Positioning System (GPS) timer, for recording a GPS timer value corresponding to a start point based on the comparison, and for sending to the DSP modem the recorded GPS timer value corresponding to the start point at a preset GPS timer reference time.

According to one aspect of the present invention, a method for synchronizing a system clock in a DSP modem of a channel card includes sending a reference signal, informing of a data transmission start point, to a Field-Programmable Gate Array (FPGA) modem, comparing a reception time point of the reference signal with a Global Positioning System (GPS) timer, recording a GPS timer value based on the comparison, sending the recorded GPS timer value, at a preset GPS timer reference time, to the DSP modem, adjusting start point information by referring to the GPS timer value, and sending traffic data to the FPGA modem together with the adjusted start point information.

According to another aspect of the present invention, a method for synchronizing a plurality of channel cards in an FPGA modem of each of the plurality of channel cards is provided. The method includes receiving traffic data from a Digital Signal Processing (DSP) modem, writing the received traffic data to a Dual-Port Random Access Memory (DPRAM), and reading the traffic data from the DPRAM after a time delay.

According to yet another aspect of the present invention, a channel card for synchronizing a first modem and a system clock in a mobile communication system is provided. The channel card includes the first modem for sending a reference signal, informing of a transmission start point, to a second modem, and the second modem for comparing a reception time of the reference signal with a Global Positioning System (GPS) timer, for recording a GPS timer value corresponding to a start point based on the comparison, and for sending to the first modem the recorded GPS timer value corresponding to the start point at a preset GPS timer reference time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for synchronizing a Digital Signal Processing (DSP) modem and a system clock in a channel card, and for synchronizing between a plurality of channel cards. Hereinafter, a DownLink (DL) indicates a channel from the DSP modem to a Field-Programmable Gate Array (FPGA) modem, and an UpLink (UL) indicates a channel from the FPGA modem to the DSP modem.

Figure 3:
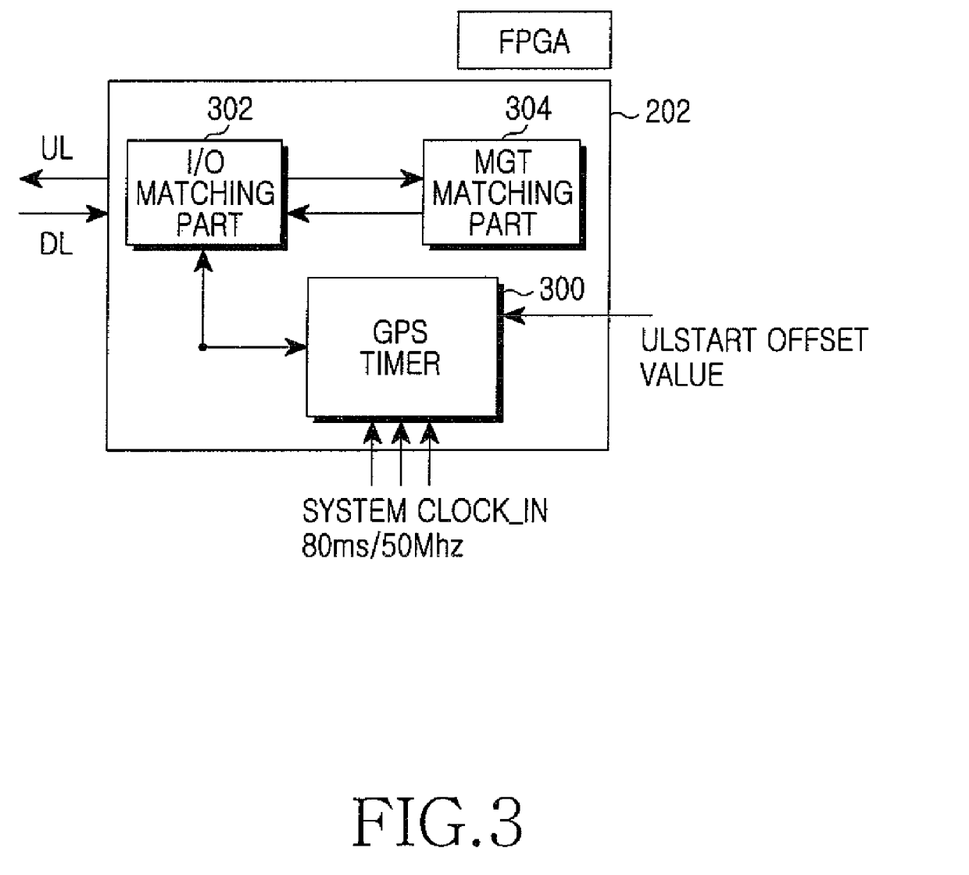
FIG. 3 is a block diagram illustrating a Field-Programmable Gate Array (FPGA) modem in a channel card according to an exemplary embodiment of the present invention.

FIG. 3 illustrates a block diagram of a FPGA modem in a channel card according to an exemplary embodiment of the present invention. In particular, FIG. 3 illustrates the synchronization between the DSP modem and the system clock and the synchronization between data output from the DSP modem and the system clock. The configuration illustrated in FIG. 3 is merely exemplary and other modem functions may be included.

The FPGA modem 202 includes a Global Positioning System (GPS) timer 300, an Input/Output (I/O) matching part 302, and a Multi-Gigabit Transceiver (MGT) matching part 304.

The GPS timer 300 receives a system clock signal (e.g., 50 MHz) from a GPS part, generates a frame clock signal of 5 ms, and provides "Clock_advanced" and "Clock_retard" functions, a UL start point, and time synchronization information with the DSP modem. For example, upon receiving a DL start signal from the DSP modem, the GPS timer 300 compares the DL start signal with a GPS time counter value and records a GPS time counter value corresponding to the DL start point in a register. Next, by transmitting the GPS time counter value corresponding to the DL start point, which was recorded in the register, to the DSP modem when the UL start signal is sent, the GPS timer 300 synchronizes with the DSP modem which uses a separate internal clock synchronization. The "Clock_advanced" function rapidly shifts a reference clock of the DL in the GPS clock based processing to compensate for the system delay and the path delay, and the "Clock_retard" function delays the reference clock of the UL.

Figure 4:
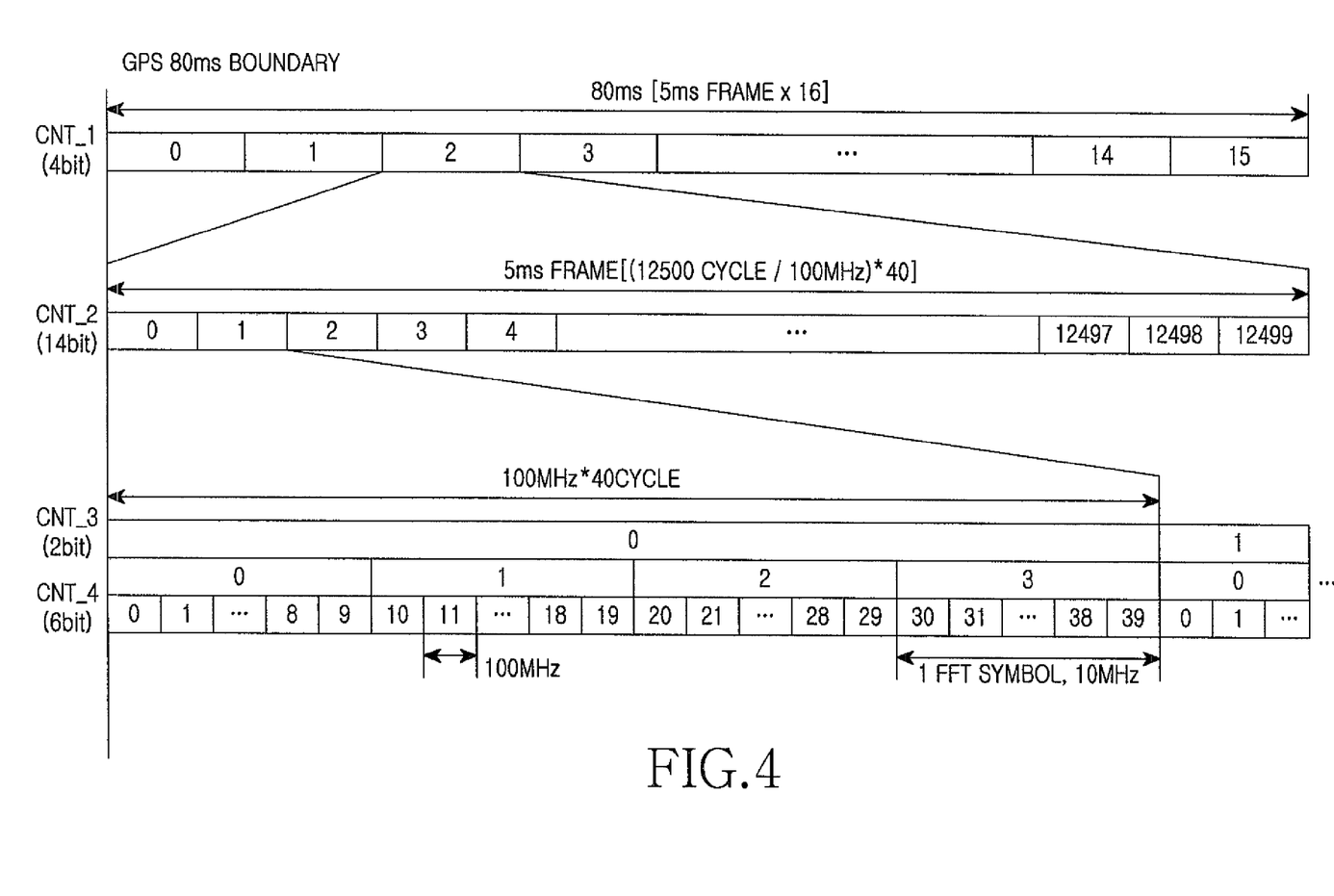
FIG. 4 is a diagram illustrating a Global Positioning System (GPS) time counter in a channel card according to an exemplary embodiment of the present invention.

In the time counter in the GPS timer 300 as illustrated in FIG. 4, the modem operation is synchronized based on the GPS counter. First, the GPS timer 300 receives 80 ms clock synchronization information from the GPS part. The modem operation is synchronized with the 80 ms GPS counter. Since one frame is 5 ms, the 80 ms (=5 ms*16) time counter counts 0~15 according to 4-bit information. The time count for the 5 ms frame equals 40 times the 12500 cycles during 100 MHz (5 ms=12500/100 MHz*40). Accordingly, the 5 ms frame time counter counts 0~12499 according to 14-bit information. The time counter of 100 MHz*40 cycle is used for the symbol synchronization.

The I/O matching part 302 formats the timing information output from the GPS timer 300 and the actual traffic data. More specifically, the I/O matching part 302 receives DL traffic data and a DL start signal from the DSP modem, sends the DL start signal to the GPS timer 300, formats the DL traffic data according to the MGT format, and sends the formatted DL traffic data to the MGT matching part 304. Also, the I/O matching part 302 receives UL traffic data from the MGT matching part 300, receives the system clock information from the GPS timer 300, converts them according to a DSP modem interface specification, and sends the converted data to the DSP modem.

Figure 5:
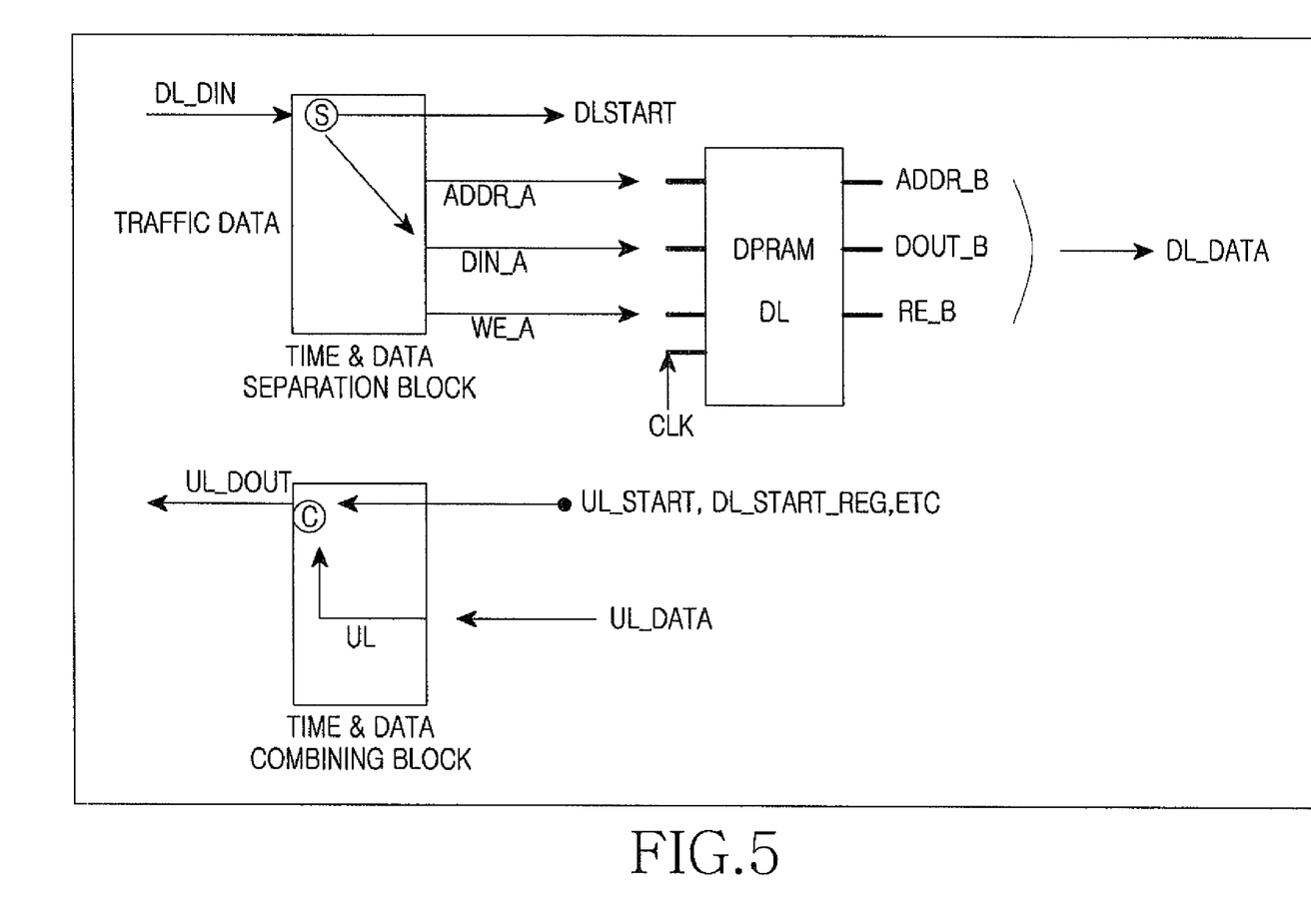
FIG. 5 is a detailed block diagram illustrating an Input/Output (I/O) matching part in a FPGA modem of a channel card according to an exemplary embodiment of the present invention.

To address the inconsistent timing between a plurality of channel cards, the I/O matching part 302 writes the DL traffic data received from the DSP modem into a Dual-Port Random Access Memory (DPRAM), delays the data for a certain time, and then reads the DL traffic data from the DPRAM. The I/O matching part 302 is further illustrated in FIG. 5. The I/O matching part 302 writes the received DL data to the DPRAM, delays the GPS timer based DL start point which is the absolute time, by 10 clocks, generates a read address and a control signal, and synchronizes data read times from the DPRAM. Herein, the delayed 10 clocks is one sample period and is variable in its implementation. Thus, the data output from the DRPAM read ports are synchronized with the GPS clock.

The MGT matching part 304 converts parallel data output from the I/O matching part 302 using a serial Low Voltage Differential Signaling (LVDS) format and matches the converted data with the InterFace (IF) board, or converts the UL serial LVDS input into parallel data and sends the converted data to the I/O matching part 302.

Figure 6:
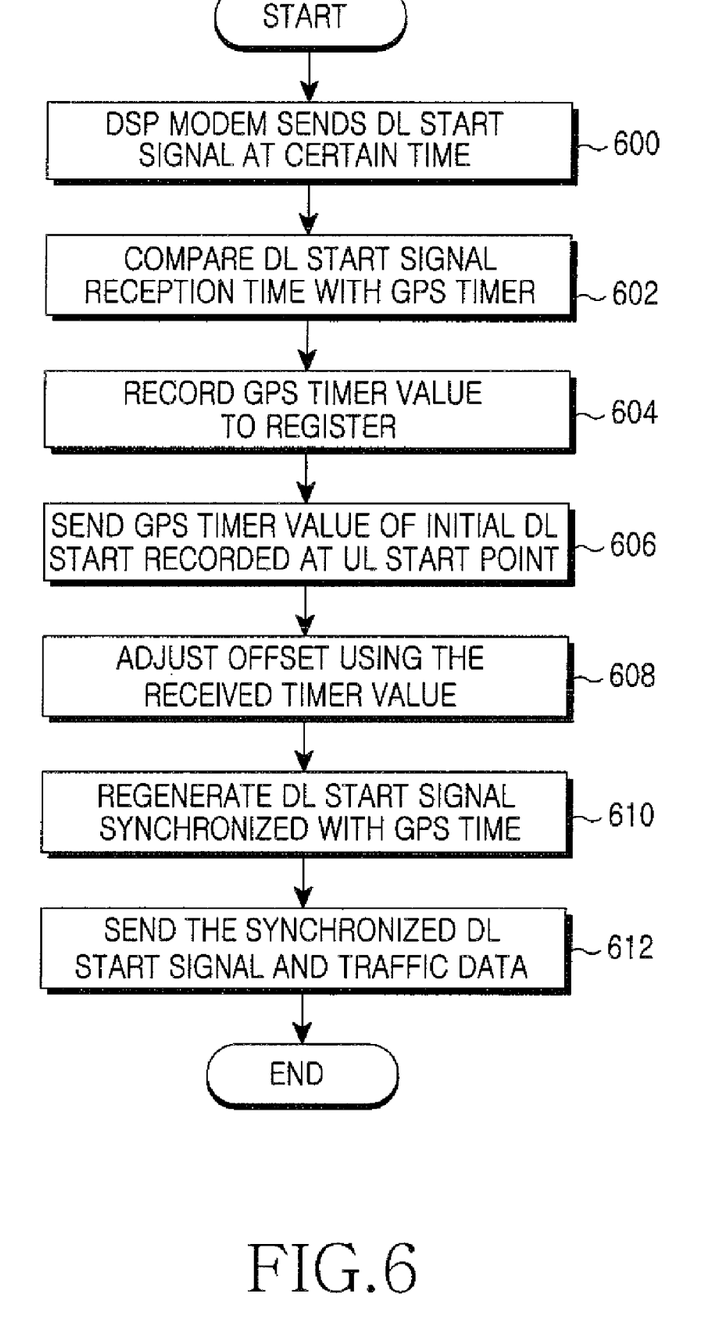
FIG. 6 is a flowchart illustrating the synchronization of the Digital Signal Processing (DSP) modem and a system clock in a channel card according to an exemplary embodiment of the present invention.

FIG. 6 illustrates a flowchart of the synchronization of the DSP modem and the system clock in the channel card according to an exemplary embodiment of the present invention. The system clock synchronization signifies the synchronization between the processing clock (e.g., 40 MHz) of the DSP modem and the system clock (e.g., 50 MHz) provided to the channel card.

Figure 7:
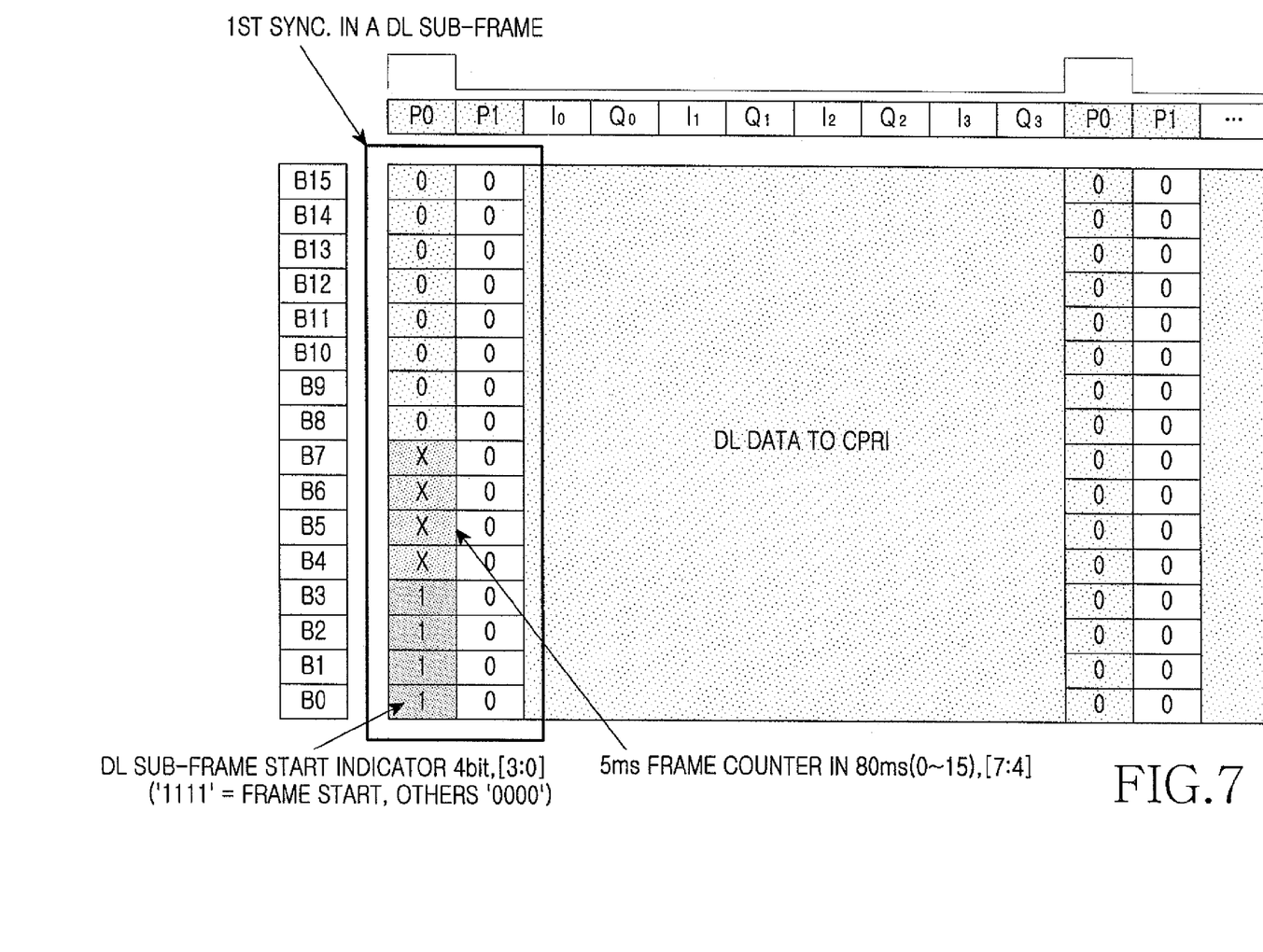
FIG. 7 is a diagram illustrating a DownLink (DL) data format according to an exemplary embodiment of the present invention.

In step 600, the DSP modem sends a DL start message to the FPGA modem through the DL at a point in time after the initial system setup. The point in time may be a preset point in time. The format of DL data, an example of which is illustrated in FIG. 7, includes 16-bit parallel data and a 1-bit sync signal. In the parallel 16-bit P0 column, the 4-bit Least Significant Bits (LSBs) of 0xF (1111) signifies the DL start and other bits are 0x0 (0000) in value.

In step 602, the FPGA modem compares the reception time of the DL start signal with the GPS time counter value. In more detail, the FPGA modem acquires the DL start point of the DSP modem based on the LSB 4-bit information of the P0 column of the DL data received from the DSP modem.

In step 604, the FPGA modem writes into its internal register the GPS timer value corresponding to the DL start point as determined in the comparison. Alternatively, the FPGA modem may write the compared GPS timer value to an external memory. Herein, the GPS timer value is represented using 16 bits in total including 14-bit CNT_2 and 2-bit CNT_3. The CNT_2 is the time counter value (0~12499) for the 5 ms frame synchronization, and the CNT_3 is the time counter value (0~3) for the symbol synchronization, which are illustrated in more detail in FIG. 4.

In step 606, the FPGA modem sends the GPS timer value of the initial DL start point written in the register to the DSP modem at a preset GPS timer based UL start time. The 16-bit data written in the register is delivered in the P1 column (the timer column) of the UL data format of FIG. 8. Similar to the DL data format, the UL data format of FIG. 8 includes 16-bit parallel data and a 1-bit sync signal. The register value storing the DL start point information from the UL data format is provided to the DSP modem using 14 bits of the P1 column (b15~2) starting from the UL start point.

Figure 8:
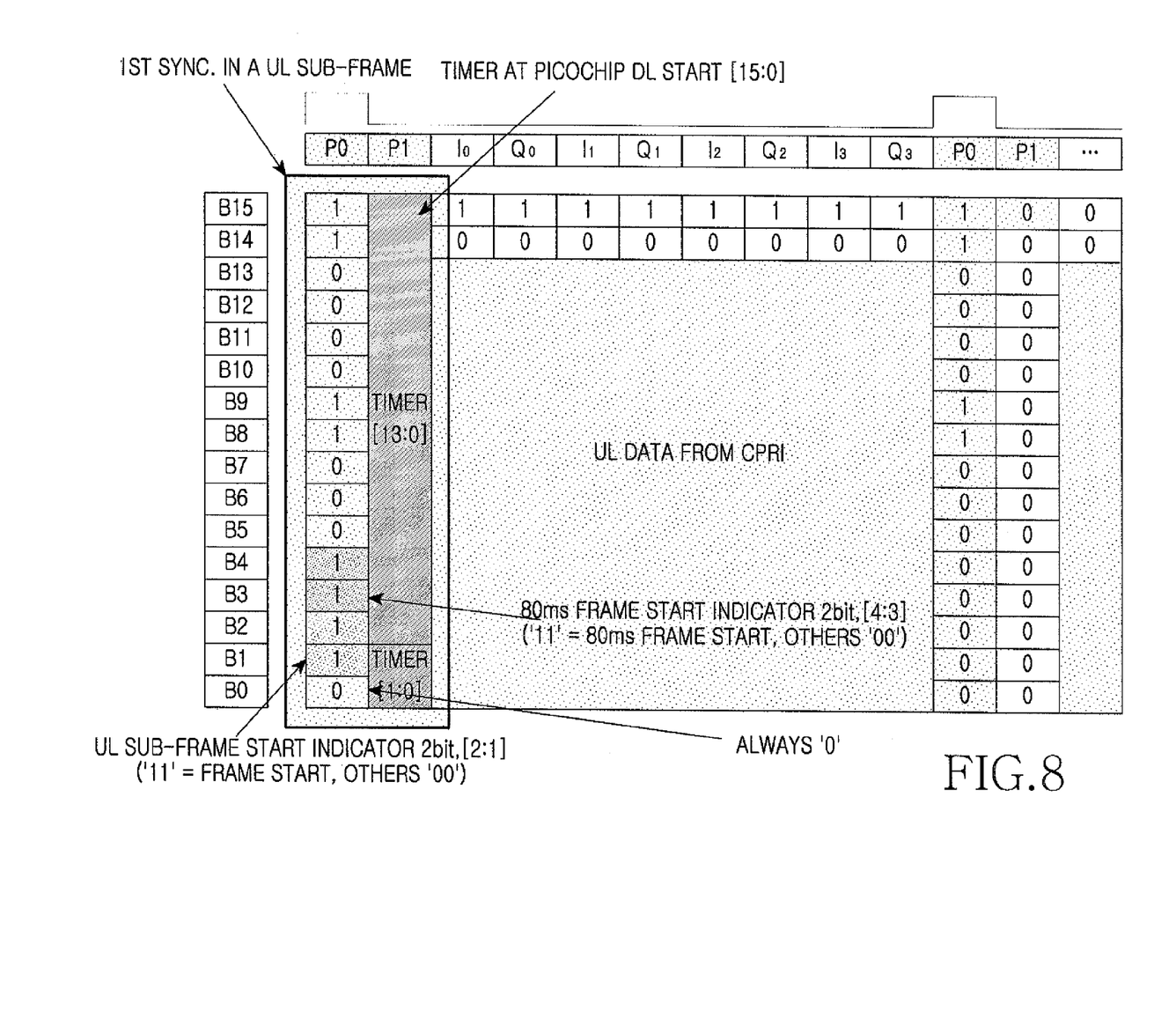
FIG. 8 is a diagram illustrating an UpLink (UL) data format according to an exemplary embodiment of the present invention.

In step 608, the DSP modem adjusts an offset by referring to the time of the initial DL start point and the DL start point information contained in the P1 column of the UL data format. The DSP modem transmits the DL start value synchronized to the system clock using the DL data format by adjusting the DL start value which is based on the GPS time. Hence, the synchronization with the system clock can be achieved.

In step 610, the DSP modem regenerates the DL start signal synchronized with the GPS time.

In step 612, the DSP modem sends the DL start signal synchronized with the GPS time, and the traffic data to the FPGA modem.

Next, the channel card finishes this process.

As described above, the DSP modem adjusts a DL start value which is based on a GSP time and transmits the DL start value synchronized with the system clock using a DL data format, to thus synchronizes with the system clock. The DSP modem generates data based on the internal core clock and formats the generated data based on the system clock, which has a different phase and frequency, for traffic data transmission. As a result, because of the different frequencies and the unfixed phase of the local clock, inconsistent output timing from different channel cards may occur due to the instability of the modem output. The method for addressing the inconsistent timing between the channel cards is explained by referring to FIG. 9.

Figure 9:
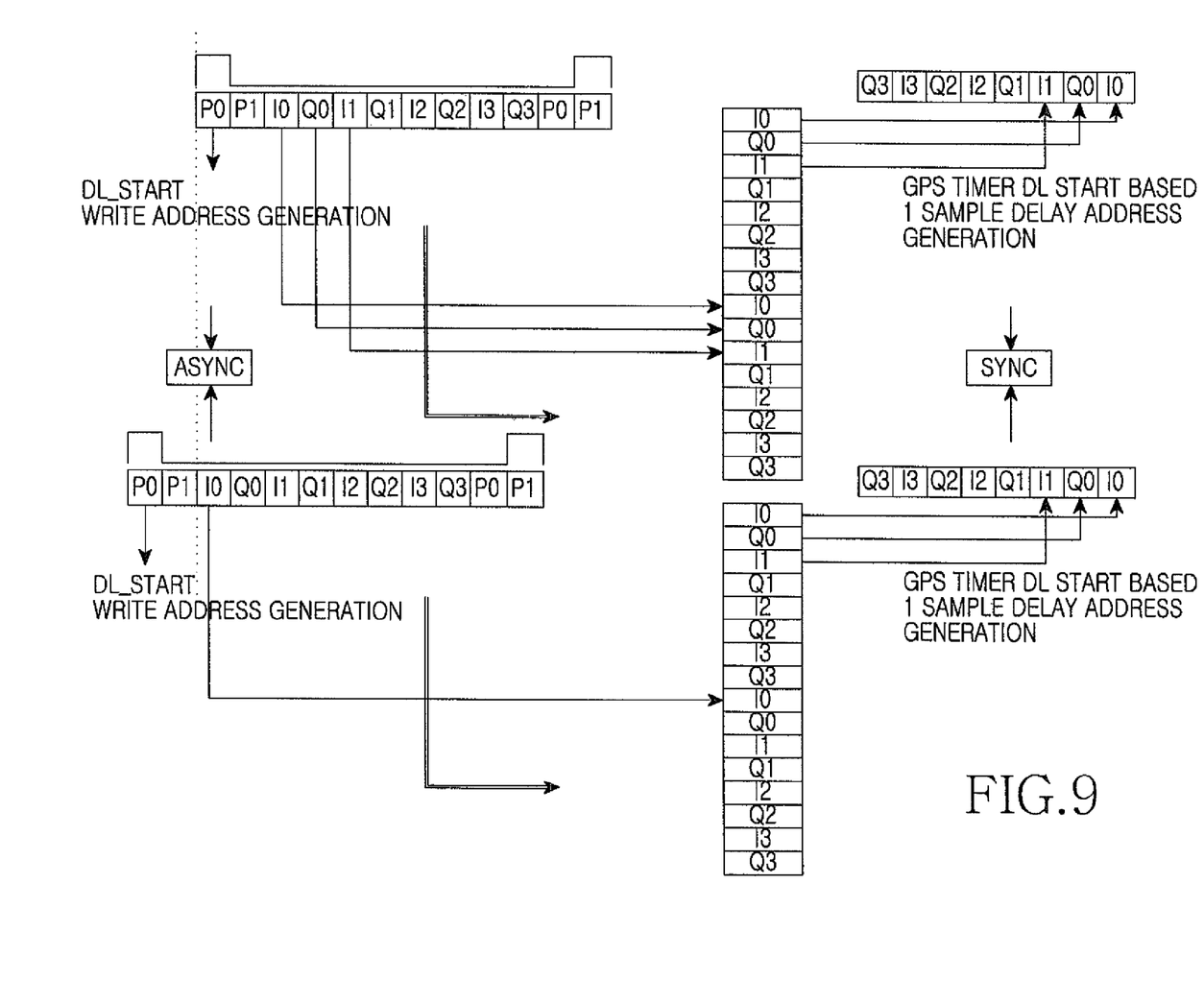
FIG. 9 is a diagram illustrating the synchronization between a plurality of channel cards according to an exemplary embodiment of the present invention.

FIG. 9 illustrates a diagram of the synchronization between a plurality of channel cards according to an exemplary embodiment of the present invention.

For synchronization between a plurality of channel cards, a memory address is generated and written in the DPRAM of the FPGA based on the input DL start point of the data format. To synchronize the channel card outputs and the modem inputs in the reading of the DPRAM, the GPS timer based DL start, which is the absolute time, is delayed by 10 clocks which is one sample writing time of the DPRAM. Next, a read address and a control signal are generated based on the delayed time. Thus, every output from the DPRAM read ports can be synchronized with the GPS clock.

In conclusion, when the DSP modem sends the data to the FPGA modem using the random synchronization generated based on the local clock for the initial system synchronization, the pulse width unit of the sync signal is 100 MHz and is inconsistent with the synchronization of the GPS. Hence, the FPGA modem writes the data received from the DSP modem into its own DPRAM, reads the data based on the GPS clock, and then sends the data to the IF board. In FIG. 6, the unit of the synchronization is 10 MHz. That is, the period of 10 MHz signifies that the synchronization between the DSP and the FPGA is based on 10 MHz. The 100 MHz-unit synchronization is read and synchronized based on the GPS clock at the DPRAM of the FPGA of FIG. 9.

As set forth above, by sending and receiving the GPS synchronization information between the DSP modem and the FPGA modem, a channel card including the DSP modem and the FPGA modem can provide synchronization between the DSP modem and the system clock and synchronization can be achieved between a plurality of the channel cards. Compared to the conventional DSP modem and FPGM modem, exemplary embodiments of the present invention may be able to provide a better DSP modem and FPGM modem in terms of cost and performance. Further, a greater degree of flexibility of the channel card may be achieved compared to an ASIC-based channel card.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel card for synchronizing a Digital Signal Processing (DSP) modem and a system clock in a mobile communication system, comprising:
the DSP modem for sending a reference signal, informing of a start of a transmission, to a Field-Programmable Gate Array (FPGA) modem; and
the FPGA modem for comparing a reception time of the reference signal with a Global Positioning System (GPS) timer, for recording a GPS timer value corresponding to a start point based on the comparison, and for sending to the DSP modem the recorded GPS timer value corresponding to the start point at a preset GPS timer reference time,
wherein the FPGA modem comprises a GPS timer for receiving system clock information from a GPS part and for recording the GPS timer value corresponding to a start point at the reception time of the reference signal, and for sending the GPS timer value corresponding to the start point to the DSP modem at the preset GPS timer reference time, and
wherein the I/O matching part delays the traffic data output from the DSP modem by one sample writing time of a Dual-Port Random Access Memory (DPRAM) and then outputs the traffic data from the DPRAM.

2. The channel card of claim 1, wherein the DSP modem adjusts start point information by referring to the GPS timer value.

3. The channel card of claim 2, wherein the DSP modem sends traffic data to the FPGA modem together with the adjusted start point information.

4. The channel card of claim 1, wherein the FPGA modem further comprises:
an Input/Output (I/O) matching part for receiving traffic data and the reference signal from the DSP modem, for sending the reference signal to the GPS timer, and for formatting the traffic data according to a Multi-Gigabit Transceiver (MGT) format.

5. The channel card of claim 4, wherein the FPGA modem further comprises:
a MGT matching part for converting parallel data output from the I/O matching part using a serial Low Voltage Differential Signaling (LVDS) format, for matching the converted data with an InterFace (IF) board, for converting UL serial LVDS input data into parallel data, and for sending the converted parallel data to the I/O matching part.

6. The channel card of claim 1, wherein a data format for data sent from the DSP modem to the FPGA modem comprises 16-bit parallel data and a 1-bit sync signal, and comprises start information.

7. The channel card of claim 1, wherein a data format for data sent from the FPGA modem to the DSP modem comprises 16-bit parallel data and a 1-bit sync signal, and comprises GPS time based start information.

8. A method for synchronizing a system clock in a Digital Signal Processing (DSP) modem of a channel card, the method comprising:
sending a reference signal, informing of a data transmission start point, from the DSP modem to a Field-Programmable Gate Array (FPGA) modem;
comparing, by the FPGA modem, a reception time point of the sent reference signal with a Global Positioning System (GPS) timer;
recording, by the FPGA modem, a GPS timer value based on the comparison;
sending, by the FPGA modem, the recorded GPS timer value, at a preset GPS timer reference time, to the DSP modem;
adjusting, by the DSP modem, start point information by referring to the GPS timer value; and
sending, by the DSP modem, traffic data to the FPGA modem together with the adjusted start point information,
wherein the FPGA modem delays the traffic data by one sample writing time of a Dual-Port Random Access Memory (DPRAM) and then outputs the traffic data from the DPRAM.

9. The method of claim 8, wherein the start point information comprises certain bit information of a time information frame.

10. The method of claim 9, wherein the certain bit information comprises four bits.

11. The method of claim 8, wherein the GPS timer value comprises a frame sync timer count value and a symbol sync timer count value.

12. The method of claim 8, further comprising:
receiving the start point information and traffic data;
sending the start point information to the GPS timer; and
formatting the traffic data according to a Multi-Gigabit Transceiver (MGT) format.

13. The method of claim 12, wherein the traffic data comprises parallel data and is converted into a serial Low Voltage Differential Signal (LVDS) format and matched with an InterFace (IF) board.

14. The method of claim 8, wherein a data format for data sent from the DSP modem to the FPGA modem comprises 16-bit parallel data and a 1-bit sync signal, and comprises start information.

15. The method of claim 8, wherein a data format for data sent from the FPGA modem to the DSP modem comprises 16-bit parallel data and a 1-bit sync signal, and comprises GPS time based start information and UL start point information.

16. A method for synchronizing a plurality of channel cards in a Field-Programmable Gate Array (FPGA) modem of each of the plurality of channel cards, the method comprising:
receiving traffic data from a Digital Signal Processing (DSP) modem;
writing the received traffic data to a Dual-Port Random Access Memory (DPRAM); and
reading the traffic data from the DPRAM after a time delay,
wherein the time delay comprises an amount of time substantially equal to one sample writing time of the DPRAM.

17. A channel card for synchronizing a first modem and a system clock in a mobile communication system, comprising:
the first modem for sending a reference signal, informing of a transmission start point, to a second modem; and
the second modem for comparing a reception time of the reference signal with a Global Positioning System (GPS) timer, for recording a GPS timer value corresponding to a start point based on the comparison, and for sending to the first modem the recorded GPS timer value corresponding to the start point at a preset GPS timer reference time,
wherein the second modem delays traffic data output from the first modem by on sample writing time of a Dual-Port Random Access Memory (DPRAM) and then outputs the traffic data from the DPRAM.

* * * * *